(12) United States Patent
Wieck

(10) Patent No.: US 6,973,330 B2
(45) Date of Patent: Dec. 6, 2005

(54) OPTIMIZED TWO-SIDED WIRELESS MODEM CARD COMPONENT PLACEMENT

(75) Inventor: Christopher Peter Wieck, San Diego, CA (US)

(73) Assignees: Sony Corporation, Tokyo (JP); Sony Electronics Inc., Park Ridge, NJ (US)

( * ) Notice: Subject to any disclaimer, the term of this patent is extended or adjusted under 35 U.S.C. 154(b) by 406 days.

(21) Appl. No.: 10/264,657

(22) Filed: Oct. 4, 2002

(65) Prior Publication Data

US 2004/0067771 A1 Apr. 8, 2004

(51) Int. Cl.[7] .............................................. H04B 1/38
(52) U.S. Cl. .................. 455/557; 455/558; 455/78; 455/83; 333/104; 333/103; 333/100; 361/760; 361/761; 361/782; 439/65; 439/60
(58) Field of Search ................ 455/557, 558, 455/78, 83, 73; 333/104, 103, 100; 361/760, 361/761, 782; 439/65, 60

(56) References Cited

U.S. PATENT DOCUMENTS

| | | | |
|---|---|---|---|
| 6,247,644 B1 * | 6/2001 | Horne et al. ................. | 235/380 |
| 6,750,737 B2 * | 6/2004 | Uriu et al. ................... | 333/133 |
| 6,757,523 B2 * | 6/2004 | Fry .............................. | 455/78 |
| 6,766,149 B1 * | 7/2004 | Hikita et al. .................. | 455/83 |
| 2003/0003778 A1 * | 1/2003 | Huang .......................... | 439/65 |
| 2003/0095386 A1 * | 5/2003 | Le et al. ...................... | 361/737 |
| 2003/0125082 A1 * | 7/2003 | Vanderhelm ................. | 455/558 |

* cited by examiner

Primary Examiner—William Trost
Assistant Examiner—Danh C. Le
(74) Attorney, Agent, or Firm—Blakely, Sokoloff, Taylor & Zafman LLP

(57) ABSTRACT

According to one embodiment of the invention, a compact wireless modem card placement in compliance with thickness requirement of type II PCMCIA standard and type II Compact Flash form factor standard is provided which includes a first side and a second side. The first side has a height clearance of approximately 2 mm. The second side, which is opposite the first side, has a height clearance of approximately 1.45 mm. In one embodiment, those components with a height greater than 1.4 mm are placed on the first side of the card. The first side of the card includes a radio-frequency transmitter (RFT) chip located at the lower left of the first side. The RFT chip performs signal processing functions to up-convert baseband signals received from a mobile station modem (MSM) chip to radio-frequency signals. The first side also includes a radio-frequency (RF) surface acoustic wave (SAW) filter located above and to the left of the RFT chip. The space between the RFT chip and the RF SAW filter is used to route the transmission line from each respective driver.

23 Claims, 1 Drawing Sheet

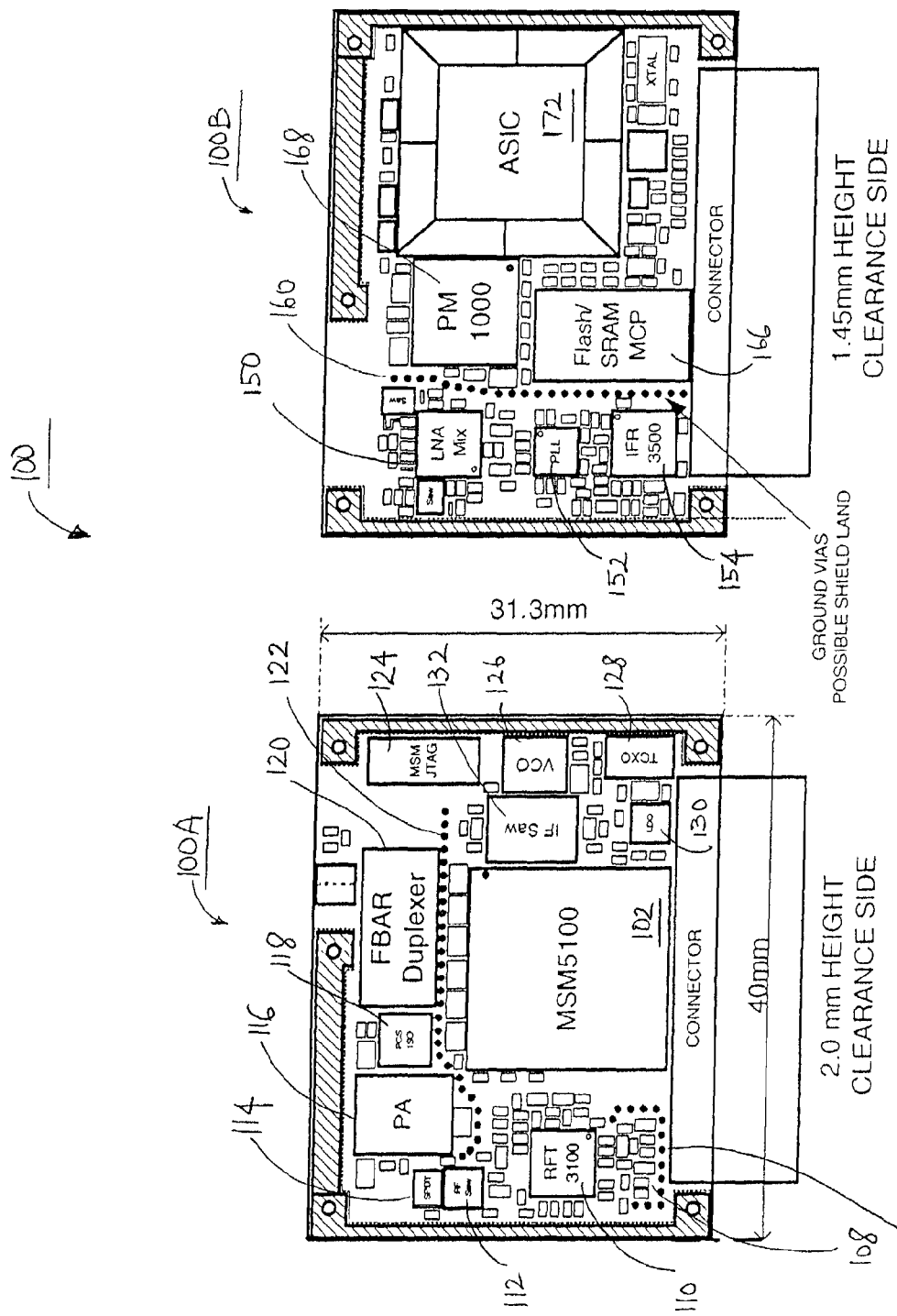

OPTIMIZED TWO-SIDED WIRELESS MODEM CARD COMPONENT PLACEMENT

FIELD

An embodiment of the invention relates to the field of communications, expansion card placement and packaging, and more specifically, relates to a method and apparatus for compact and optimized placement of components in a two-sided wireless modem card.

BACKGROUND

As portable computer systems such as notebooks, laptops, and hand-held devices, etc., become more popular and in demand, portable expansion devices such as memory cards, modem cards, and portable disk-drives have become more and more important in system design and implementation. Various standards have been developed to standardize the physical specifications, electrical specifications, and software architecture for these portable expansion devices. In particular, the Personal Computer Memory Card International Association (PCMCIA) was formed by several companies including manufacturers of computers, semiconductors, peripheral devices, etc. to define standards for the various portable expansion devices (e.g., PC cards). For example, PCMCIA standards for PC cards are developed to allow compatibility and portability between various computer systems designed and manufactured by different companies. There are currently three standardized PC card physical form factors defined by PCMCIA: (1) PCMCIA Type I having a thickness of 3.3 mm; (2) PCMCIA Type II having a thickness of 5.0 mm; and (3) PCMCIA Type III having a thickness of 10.5 mm. In addition, another organization known as the CompactFlash Association (CFA) was formed to focus on developing standards for small, lightweight, and low-power products used in various computer and communication systems (e.g., portable and desktop computers, digital cameras, hand-held devices, etc.). For example, a CompactFlash (CF) Type II card standard defines specification for a variety of devices including high capacity flash cards, wireless pager card, modem cards, etc., that can be used in various portable computer systems and hand-held devices. The CF Type II form factor standard also requires a thickness of 5 mm or less, similar to the PCMCIA Type II PC card standard.

Some of the various cards that are increasingly used in computer systems are wireless modem cards. In particular, wireless modem cards that operate according to the Code Division Multiple Access (CDMA) technology are increasingly used in portable computer systems and devices to enable wireless communications in various system configurations and media such as digital cellular network, wireless personal communication services (PCS), wireless local loop, etc. These wireless modem cards typically conform to PCMCIA Type II and/or CF Type II form factor specifications which require a thickness of 5 mm or less. A CDMA wireless modem card typically contains many components that are designed and implemented to perform various signal processing functions required in wireless communications. Because of the physical size limitations (e.g., the length, width, and height or thickness) of the modem card and other constraints, it has been a challenge to design and manufacture modem cards such as CDMA wireless modem cards that conform to the physical and other specifications of PCMCIA Type II or CF Type II standards. In particular, the placement of the various components required in a CDMA wireless modem card plays an important role in meeting the various functional and physical requirements. Thus, there exists a need for the placement of various components of a wireless modem card that allows for an efficient compact design while meeting the functional requirements (e.g., preserving effective and efficient signal flow and electromagnetic interference (EMI) compatibility).

BRIEF DESCRIPTION OF THE DRAWINGS

The invention may be best understood by referring to the following description and accompanying drawings that are used to illustrate embodiments of the invention, in which:

FIG. 1A is a block diagram showing one side of a CDMA wireless modem according to one embodiment of invention; and FIG. 1B is a block diagram of showing the other side of a CDMA wireless modem card according to one embodiment of the invention.

DETAILED DESCRIPTION

In the following detailed description numerous specific details are set forth. However, it is understood that embodiments of the invention may be practiced without these specific details.

In the discussion below, according to one embodiment of the invention, a compact and efficient two-sided wireless modem card component placement and arrangement in compliance with the PCMCIA Type II and the CF Type II card standards is described. In one embodiment, the compact wireless modem card includes two sides that are placed opposite to each other: (1) a first side having a height clearance of approximately 2 mm; and (2) a second side opposite the first side and having a height clearance of approximately 1.45 mm. The wireless modem card, with enclosure, has a thickness or height of approximately 5 mm or less, which meets the thickness requirement of the PCMCIA Type II or CF Type II form factor specifications. In one embodiment, the tall components (e.g., the components with a height greater than 1.4 mm) are placed on the first side of the card. These tall components may include the Power Amplifier (PA), the Isolator (PCS ISO), the Film Bulk Acoustic Resonator (FBAR) duplexer, the Intermediate Frequency (IF) Surface Acoustic Wave (SAW) filter, and Voltage Controlled Oscillator (VCO).

FIGS. 1A and 1B show a placement drawing representing two sides 100A and 100B of a wireless modem card 100 in accordance with one embodiment of the invention. As shown in FIGS. 1A and 1B, the two sides 100A and 100B are illustrated in a butterfly expansion as if flipping the card 100 horizontally to view the other side. The design and placement represented by FIGS. 1A and 1B is for a single-band CDMA PCS modem card, though a dual band card can be created based on the teachings of the invention to obtain similar results.

As shown in FIGS. 1A and 1B, one side of the card (side 100A, also referred to as the first side herein) has a height clearance side of approximately 2.0 mm. The other side of the card (side 100B, also referred to as the second side herein) has a height clearance side of approximately 1.45 mm). In one embodiment, one of the results achieved by the component placement and arrangement shown in FIGS. 1A and 1B is that all the tall components (e.g., those components with a height greater approximately greater than 1.4 mm) are placed on one side of the card (side 100A which has a height clearance of approximately 2.0 mm). This placement of the tall components on side 100A is important because it allows the whole card 100, with enclosure, to be 5.0 mm or less in thickness, which is a requirement in a Type II PCMCIA or Type II CompactFlash (CF) form factor. If this was not achieved then the clearance on the other side (side 100B) would need to be raised by about 0.4 mm, which would put extreme requirements on the PCB stack-up to comply with the overall thickness requirement. The PCB thickness required for a two-sided card is typically around 1 mm (e.g., for 8 layers) to achieve the isolation and impedance matching characteristics necessary for both a high density and high frequency, impedance sensitive design. Reducing the number of layers or thickness of the PCB would likely result in signal integrity issues (e.g., allowing noise to spread due to lack of ground isolation and return). Moreover, additional ground area would likely be necessary to sink thermal energy in such a compact design.

The small and thin form factor used for a modem card would not be meaningful or beneficial unless a good signal flow is preserved, which is especially critical for the RF chains included in the modem card (e.g., the CDMA wireless modem card). In addition to minimizing the distance that the various signals have to travel between components, certain signals that can cause electromagnetic interference (EMI) have to be isolated. As described in more details below, it can be understood and appreciated by one skilled in the art that the component placement or floor plan in accordance with one embodiment of the invention can be beneficial in many ways. To avoid including unnecessary details which may obscure various aspects of the invention, the description of the component placement or floor plan herein is focused on the sections that are not commonly reproduced, or often have non-optimum signal flow that is improved upon in this design. It is also important to make the distinction between what is achievable by a placement of one section by itself, and obtaining an overall topology that brings forth a majority of the most desirable elements.

Referring again to FIGS. 1A and 1B, beginning on the lower left of the first side 100A (which has a 2.0 mm height clearance) is a radio frequency transmit (RFT) device 110 (also called transmit processor herein). In one embodiment, the RFT chip is configured to receive baseband signals from a Mobile Station Modem (MSM) chip located to the right of the RFT chip and to perform signal processing functions to up-convert the baseband signals to radio-frequency signals. In one embodiment, as shown in FIG. 1A, the radio frequency transmit device is the RFT3100 Baseband-to-Radio Frequency Transmit Processor designed by Qualcomm Inc. of San Diego, Calif. The RFT3100 is a device that receives the balanced analog TX I/Q signals from a baseband processor modem 102 (e.g., the MSM5100 shown in FIG. 1A), up-converts the TX signals using an on-chip synthesized IF_LO, filters, and then up-converts again to drive the RF signals through an RF Saw filter 112 that is located above and to the left of the RFT3100. The space between the RFT3100 and the RF Saw is used to route the transmission line from each respective driver. Below the RFT3100 is a sensitive tank circuit 108 for the IF_LO generation. In one embodiment, the IF_LO generation is performed by an on-chip synthesized IF_LO circuit included in the RFT chip. The tank circuit 108 is best kept isolated from the rest of the circuitry. As shown in FIG. 1A, ground vias 106 represented by the black dots enclose the tank circuit 108 to prevent EMI that can travel through the inner layers of the PCB.

Moving to the top left, as illustrated in FIG. 1A, the RF Saw output, which is typically a dual Saw for the PCS band, passes though an RF SPDT (single-pole-double-throw) switch 114 which then leads to the power amplifier (PA) input on the left of the PA device 116. In one embodiment, the PA output to the right of the PA device 116, passes through an isolator 118 (e.g., PCS isolator), and to the TX port of the FBAR duplexer 120. It is very beneficial to have this path short, which minimizes radiation and insertion loss, because the signal that goes through this path is the highest power signal on the PCB. In one embodiment, ground vias 122, in addition to those that can be placed under the respective components, are shown on the lower boundary of this chain. The space can also provide a gap for some shielding, if necessary. As shown in FIG. 1A, this signal path is designed to provide about the shortest TX chain possible, and to allow for two "walls" of ground vias/shield lands between the high power PA output and the sensitive IF_LO tank on the RFT3100. For example, by using an 8 layer PCB, an experienced router can provide at least two layers of ground under the TX chain providing both isolation and some thermal sink.

Referring now to FIG. 1B, the receive (RX) chain and main LO synthesizer which require isolation from the transmitter are located on the second side 100B (which has a height clearance of 1.45 mm). The main components of the RX chain are located on the left portion of the second side 100B of the PCB, opposite in both left/right side and flip side from the transmitter (the TX chain) located on the first side 100A. In other words, the RX chain is located as far away as possible from the transmitter. In this embodiment, inner ground layers function as the shielding between the TX and RX chains, thus removing much of the shielding requirements. In addition, excellent signal flow can be achieved by this placement/arrangement. The RX port of the FBAR duplexer 120, which is located on the upper right of the first side 100A, is located opposite (flip side) the LNA input(s) to the receiver, thus minimizing line length losses. In one embodiment, the LNA/Mixer IC 150 passes the LNA output through an RF Saw, and then down-converts the RX signal to IF signal. The IF outputs are located opposite the inputs of the IF Saw filter 132. As mentioned above, the IF Saw 132 is located on the first side (2 mm height side) due to clearance requirement. Any TX signal that couples to the IF Saw input will be filtered by the IF Saw and subsequent baseband filtering, so this exposure is not so critical to the RX chain. In addition, the IF signals are balanced, reducing the effect of coupled noise. In this embodiment, as illustrated in FIGS. 1A and 1B, the IF Saw outputs are located directly opposite the IF inputs of an Intermediate Frequency Receiver (IRF) chip 154, minimizing line length and potential for interference. In this embodiment, the IRF chip 154 is the IFR3500 IF-to-baseband processor designed by Qualcomm Inc. of San Diego, Calif. Bridged by the IF Saw on the opposite side, the PLL synthesizer IC 152 resides between the LNA/Mixer IC and the IFR3500. This has the benefit of not only using the space, but the PLL serves the IFR3500's IF_LO synthesis. The loop filter and tank circuit for the IFR are isolated on the far left edge of the PCB. The PLL also loops to the VCO 126 which is located directly opposite the PLL, reducing the potential for noise. The VCO is located on the 2.0 mm height clearance side (first side 100A), but it is a shielded module and removed from the PA across the span of the PCB. The VCO output is returned to the PLL, but also serves the LNA/Mixer IC which is located nearby. As shown in FIG. 1A, below the VCO is the TCXO (temperature compensated crystal oscillator) 128, which serves the IFR and the PLL, among other devices. It is also beneficial to have the TCXO as far away from the PA as possible to reduce thermal gradients that can detune the TCXO output frequency and subsequently the receiver during periods of transmitter on/off state transitions. As illustrated in FIG. 1B, ground vias/shield land space 160 round out the isolation of the RX chain from other components that are located on the same side (second side 100B).

In the embodiment illustrated by FIGS. 1A and 1B, the digital IFR I/Q data outputs are oriented towards the MSM5100 where they are sent. Across the ground vias 160 is the memory (e.g., Flash/SRAM) device 166, which can be a concern, but the short distance to the MSM for the address and data routing minimizes the source of noise from these signals. Above the Flash/SRAM is a power management (PM) integrated circuit (IC) 168. In this embodiment, the PM IC is the PM1000 device designed by Qualcomm Inc. of San Diego, Calif. This is a relatively quiet IC which serves as another spacer to isolate noise from the RX Chain. It also provides a short routing distance of the voltage supplied to the most critical RX and main LO synthesizer components. The PM1000 also serves power to many of the other components on the board, so it's relatively central location is ideal. Many of the non-supply signals are to the MSM, which is also centrally located on the opposite side of the PCB. Decoupling of the MSM's supply is done opposite the center of the MSM underneath the PM1000. In addition, that location is also used to decouple the Flash/SRAM to the right. Similarly, some of the supply bypass capacitors for the PM1000 are opposite the chip, saving space from spreading them out on the same side around the PM1000. These large capacitors would be the ones decoupling supplies to the RFT, MSM (3 voltages), and possibly the VCO and TCXO.

Referring again to FIG. 1B, the last major and largest component shown is an interface ASIC (application specific integrated circuit) 172. This is somewhat unrelated to the placement optimization of the invention, as it can appear in many sizes. However, its position somewhat opposite the MSM does facilitate shorter connections. Variations on the placement can include mirroring the TX and RX placements from left to right if desired, rearranging the digital portion including the Flash/SRAM if a non-Multi-chip-Module solution is used, or some other digital rearrangement if an interface ASIC of different size/dimension is used. They major benefits of this floor planning are in the RX chain with the placement of the RX IF Saw and VCO opposite, and the relative distant and opposite placement of the TX chain. It is beneficial to have the TX and RX signals interfacing with the duplexer be relatively short to minimize line loss.

While the invention has been described in terms of several embodiments, those of ordinary skill in the art will recognize that the invention is not limited to the embodiments described, but can be practiced with modification and alteration within the spirit and scope of the appended claims. The description is thus to be regarded as illustrative instead of limiting.

What is claimed is:

1. A compact wireless modem card placement in compliance with thickness requirement of type II PCMCIA standard and type II Compact Flash form factor standard, comprising:
   a first side having a first height clearance, the first side including:
   a mobile station modem (MSM) chip,
   a radio-frequency transmitter (RFT) chip located at a lower left of the first side, the RFT chip to perform signal processing functions to up-convert baseband signals received from the MSM chip to radio-frequency signals, and
   a radio-frequency (RF) surface acoustic wave (SAW) filter located above and to the left of the RFT chip,
   a tank circuit located below the RFT chip for IF_LO generation performed by an on-chip synthesized IF_LO circuit included in the RFT chip, and
   a plurality of ground vias enclosing the tank circuit to prevent electro-magnetic interference (EMI); and
   a second side opposite the first side and having a second height clearance,
   wherein components with a height greater than or substantially equal to the second height clearance are placed on the first side of the card.

2. The compact wireless modem card of claim 1, wherein
   the first side having the first height clearance of approximately 2 millimeters (mm); and
   the second side having the second height clearance of approximately 1.45 mm.

3. The compact wireless modem card of claim 1 further including:
   a power amplifier (PA) device;
   an isolator coupled to the PA device and located to the right of the PA device; and
   a duplexer coupled to the isolator and located to the right of the isolator.

4. The compact wireless modem card of claim 3 wherein the MSM chip is located to the right of the RFT chip and below the isolator and the duplexer.

5. The compact wireless modem card of claim 3 further including:
   an intermediate frequency (IF) SAW filter located to the right of the MSM chip.

6. The compact wireless modem card of claim 3 further including ground vias located on the lower boundary of a receive (RX) chain formed by the PA device, the isolator, and the duplexer.

7. The compact wireless modem card of claim 6 further including:
   a low noise amplifier (LNA) Mixer integrated circuit (IC) located on the upper left of the second side, wherein inputs of the LNA Mixer IC are located opposite a receive (RX) port of the duplexer;
   a phase locked loop (PLL) circuit located on the left of the second side and below the LNA Mixer IC; and
   an intermediate frequency receiver (IFR) chip located of the left of the second side and below the PLL circuit.

8. The compact wireless modem card of claim 7 wherein the IF outputs from the LNA Mixer are located opposite the inputs of the IF SAW filter.

9. The compact wireless modem card of claim 8 wherein the outputs of the IF SAW filter are located opposite the inputs of the IFR chip.

10. The compact wireless modem card of claim 9 further including a loop filter and a tank circuit for the IFR chip which are located to the left of the IFR chip.

11. The compact wireless modem card of claim 7 further including a plurality of ground vias located to the right of the RX chain including the LNA Mixer, the PLL circuit, and the IFR chip.

12. The compact wireless modem card of claim 11 further including a power management (PM) unit located to the right of the LNA Mixer.

13. The compact wireless modem card of claim 12 further including an application specific integrated circuit (ASIC) located to the right of the PM unit.

14. A method for producing a compact wireless modem card in compliance with thickness requirement of type II PCMCIA standard and type II Compact Flash form factor standard, comprising:
   producing a first side having a first height clearance;
   producing a second side opposite the first side and having a second height clearance less than the first height clearance;
   placing those components with a height greater than or substantially equal to the second height clearance on the first side of the card;
   placing a radio-frequency transmitter (RFT) chip at the lower left of the first side, the RFT chip to perform signal processing functions to up-convert baseband signals received from a mobile station modem (MSM) chip to radio-frequency signals;
   placing a radio-frequency (RF) surface acoustic wave (SAW) filter above and to the left of the RFT chip;
   placing a tank circuit below the RFT chip for IF_LO generation performed by an on-chip synthesized IF_LO circuit included in the RFT chip; and
   placing a plurality of ground vias around the tank circuit to prevent electro-magnetic interference (EMI).

15. The method of claim 14 further including:
   placing a power amplifier (PA) device above and to the right of the RF Saw filter;
   placing an isolator, coupled to the PA device, to the right of the PA device; and
   placing a duplexer, coupled to the isolator, to the right of the isolator.

16. The method of claim 15 further including ground vias located on a lower boundary of a receive chain (RX chain) formed by the PA device, the isolator, and the duplexer.

17. The method of claim 16 further including:
   placing the MSM chip to the right of the RFT chip and below the isolator and the duplexer; and
   placing an intermediate frequency (IF) SAW filter to the right of the MSM chip.

18. The method of claim 17 further including:
   placing a low noise amplifier (LNA) Mixer integrated circuit (IC) on the upper left of the second side, wherein inputs of the LNA Mixer IC are located opposite a receive (RX) port of the duplexer;
   placing a phase locked loop (PLL) circuit on the left of the second side and below the LNA Mixer IC; and
   placing an intermediate frequency receiver (IFR) chip on the left of the second side and below the PLL circuit.

19. The method of claim 18 wherein the LNA Mixer IC passes a LNA output through the RF SAW filter and down-converts a received signal (RX signal) to an intermediate frequency (IF) signal, the IF outputs from the LNA Mixer are located opposite the inputs of the IF SAW filter, and wherein the outputs of the IF SAW filter are located opposite inputs of the IFR chip.

20. The method of claim 18 further including:
   placing a loop filter and a tank circuit for the IFR chip to the left of the IFR chip;
   placing a plurality of ground vias to the right of a receive chain (RX chain) which includes the LNA Mixer, the PLL circuit, and the IFR chip.

21. The method of claim 20 further including:
   placing a power management (PM) unit to the right of the LNA Mixer.

22. The method of claim 21 further including:
   placing an application specific integrated circuit (ASIC) on the second side to the right of the PM unit.

23. The method of claim 14, wherein the first height clearance is approximately equal to 2 millimeters in height and the second height clearance is approximately equal to 1.45 millimeters in height.

* * * * *